United States Patent [19]

Eng et al.

[11] Patent Number: 5,048,013

[45] Date of Patent: Sep. 10, 1991

[54] TRANSMISSION CONGESTION CONTROL METHOD AND APPARATUS

[75] Inventors: Kai Y. Eng, Eatontown; Richard D. Gitlin, Little Silver; Mark J. Karol, Fair Haven, all of N.J.

[73] Assignee: AT&T Bell Laboratories, Murray Hill, N.J.

[21] Appl. No.: 505,796

[22] Filed: Apr. 6, 1990

[51] Int. Cl.$^5$ .............................................. H04J 3/16
[52] U.S. Cl. ...................................... 370/79; 370/112; 370/58.1; 379/273; 379/221; 340/825.08; 375/118
[58] Field of Search ............... 370/112, 79, 85.6, 94.1, 370/94.2, 60, 60.1, 58.1, 58.2, 91, 58.3, 61; 379/273, 221; 340/825.08; 375/118

[56] References Cited

U.S. PATENT DOCUMENTS

| | | | |
|---|---|---|---|
| 4,538,259 | 8/1985 | Moore | 370/85.6 |
| 4,864,495 | 9/1989 | Inaba | 370/94.1 |
| 4,914,653 | 4/1990 | Bishop et al. | 370/85.6 |
| 4,916,692 | 4/1990 | Clarke et al. | 370/92 |
| 4,962,497 | 10/1990 | Ferenc et al. | 370/60 |

OTHER PUBLICATIONS

"A Congestion Control Framework for High-Speed Integrated Packetized Transport", G. M. Woodruff, R. G. H. Rogers, and P. S. Richards, Proceedings of Globecom '88.
"ATM: Bandwidth Assignment and Bandwidth Enforcement Policies" G. Gallassi, G. Rigolio, L. Fratta, Proceedings of Globecom '89.
"Congestion Control Through Input Rate Regulation" M. Sidi, W-Z, Liu, I. Cidon, I. Gopal, Proceedings of Globecom '89.
"Window-Based Congestion Management in Broadband ATM Networks: The Performance of Three Access-Control Policies", W. E. Leland Proceedings of Globecom '89.
"Meeting the Challenge: Congestion and Flow Control Strategies for Broadband Information Transport" A. E. Eckberg, Jr., D. T. Luan, D. M. Lucantoni, Proceedings of Globecom '89.

Primary Examiner—Douglas W. Olms
Assistant Examiner—Dang Ton

[57] ABSTRACT

A congestion control method and apparatus for use with a communications link comprising a plurality of N channels. A plurality of at most N−1 queues are sequentially polled, and data is output therefrom to the communications link, thereby leaving at least one remaining channel. After the at most N−1 queues are polled, a determination is made as to which of the at most N−1 queues is closest to a data overflow condition. The remaining at least one channel is then utilized to transmit data from the queues which are closest to overflow.

9 Claims, 2 Drawing Sheets

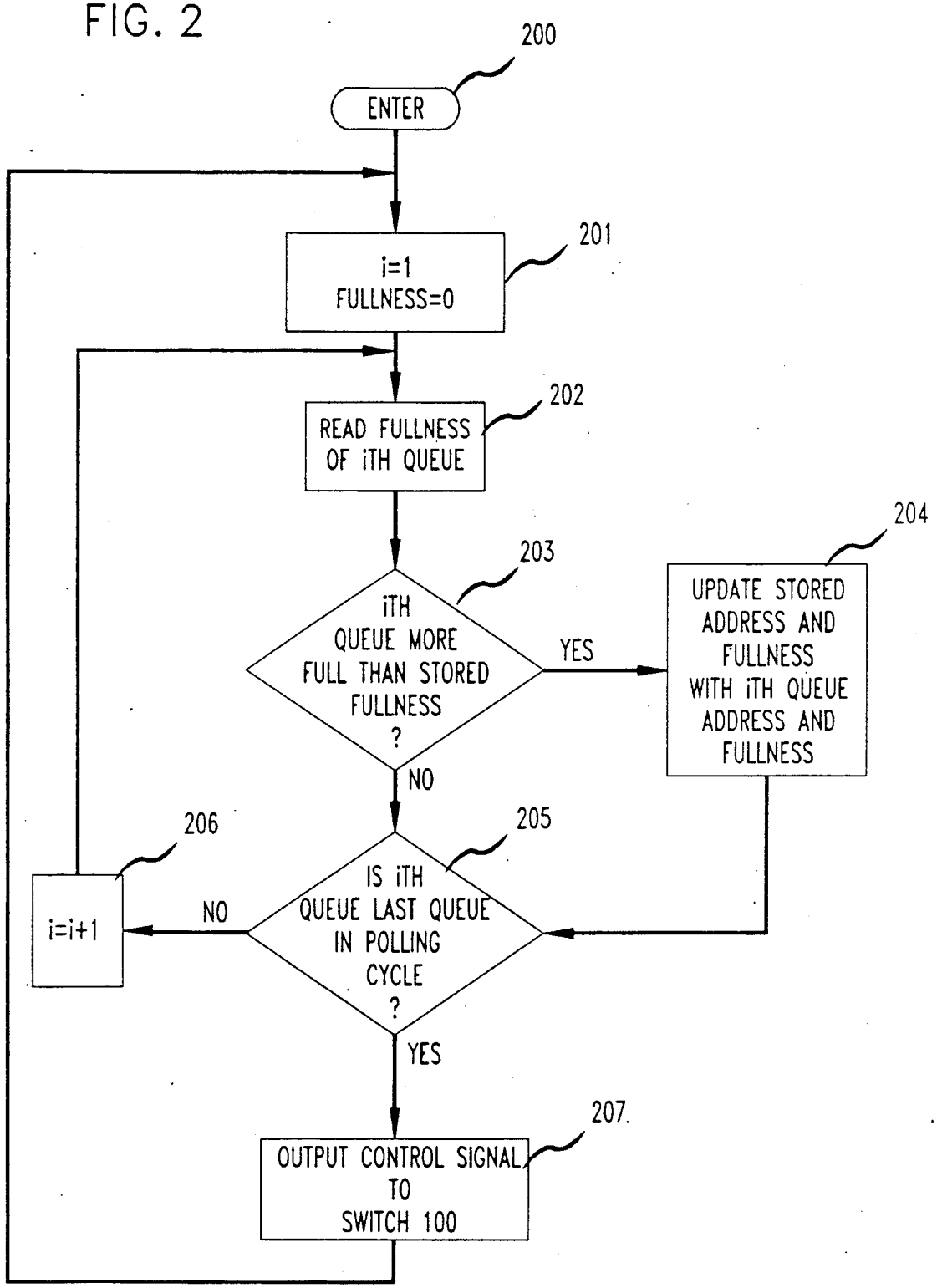

TRANSMISSION CONGESTION CONTROL METHOD AND APPARATUS

TECHNICAL FIELD

This invention relates generally to communications systems and, more particularly, to congestion control in communications systems.

DESCRIPTION OF THE PRIOR ART

High speed communications links are typically utilized to transmit data from a plurality of lower speed channels. Usually, data from each of the plurality of lower speed channels is stored temporarily in an associated queue, and the queues are serviced sequentially, for example, by a time-division multiplexer or a switch. Consider the situation where one of the queues suddenly receives a large burst of data. The multiplexer may not be able to service this queue fast enough. Since the queue is of finite capacity, data overflow would occur. This data overflow condition is known as congestion.

Several arrangements have previously been employed in attempts to overcome the problem of congestion. One such arrangement is disclosed in the article "Congestion Control Through Input Rate Regulation", by M. Sidi et al. in IEEE GLOBECOM 1989. In the Sidi article, a plurality of terminals are connected to a network, and each terminal is assigned a predetermined maximum input data rate. Congestion is controlled by dropping data if the data input rate of the terminal exceeds the predetermined maximum input rate. Alternatively, the input of data can be temporarily halted until a later time. The problem with this arrangement is that a determination of resource requirements must be made for each terminal in advance of operation. Since this prior determination cannot be made accurately, one must account for the worst possible case. This results in reserving more network resources for a particular terminal than is normally needed, leading to underutilized resources.

In other prior arrangements, each terminal is allowed to transmit as much data in as short a time as is required by the terminal. Congestion is controlled in such prior arrangements by sending a control message to the terminal if congestion occurs. This control message inhibits transmission from the terminal and thereby avoids congestion. This arrangement does not function well in high speed networks because it is quite likely that by the time the control message can be generated and transmitted to the terminal, congestion has already occured and data has been lost.

SUMMARY OF THE INVENTION

These and other problems in prior congestion control arrangements are overcome by employing a plurality of at most $N-1$ queues, an N channel communications link, and a multiplexer for multiplexing the channels onto the communications link. In accordance with the invention, the plurality of at most $N-1$ queues are sequentially polled. During the time that a queue is polled, data from that queue is supplied as an output onto an associated one of the N channels of the communications link, thereby leaving at least one remaining channel after all the queues have been polled. Simultaneously with the polling, the queues are monitored to determine which one or more of the queues is nearest to a data overflow condition, i.e., has the most data stored therein relative to the other queues. After the at most $N-1$ queues have been polled and monitored, data from the one or more queues which is nearest to a data overflow condition is transmitted on the at least one remaining channel. This way, the extra channel is automatically provided to the most heavily loaded channel and its cost is shared by all channels.

BRIEF DESCRIPTION OF THE DRAWING

In the drawing:

FIG. 2 shows a flow diagram depicting operational steps of an exemplary implementation of the monitor employed in the embodiment of FIG. 1.

DETAILED DESCRIPTION

Figure 1:
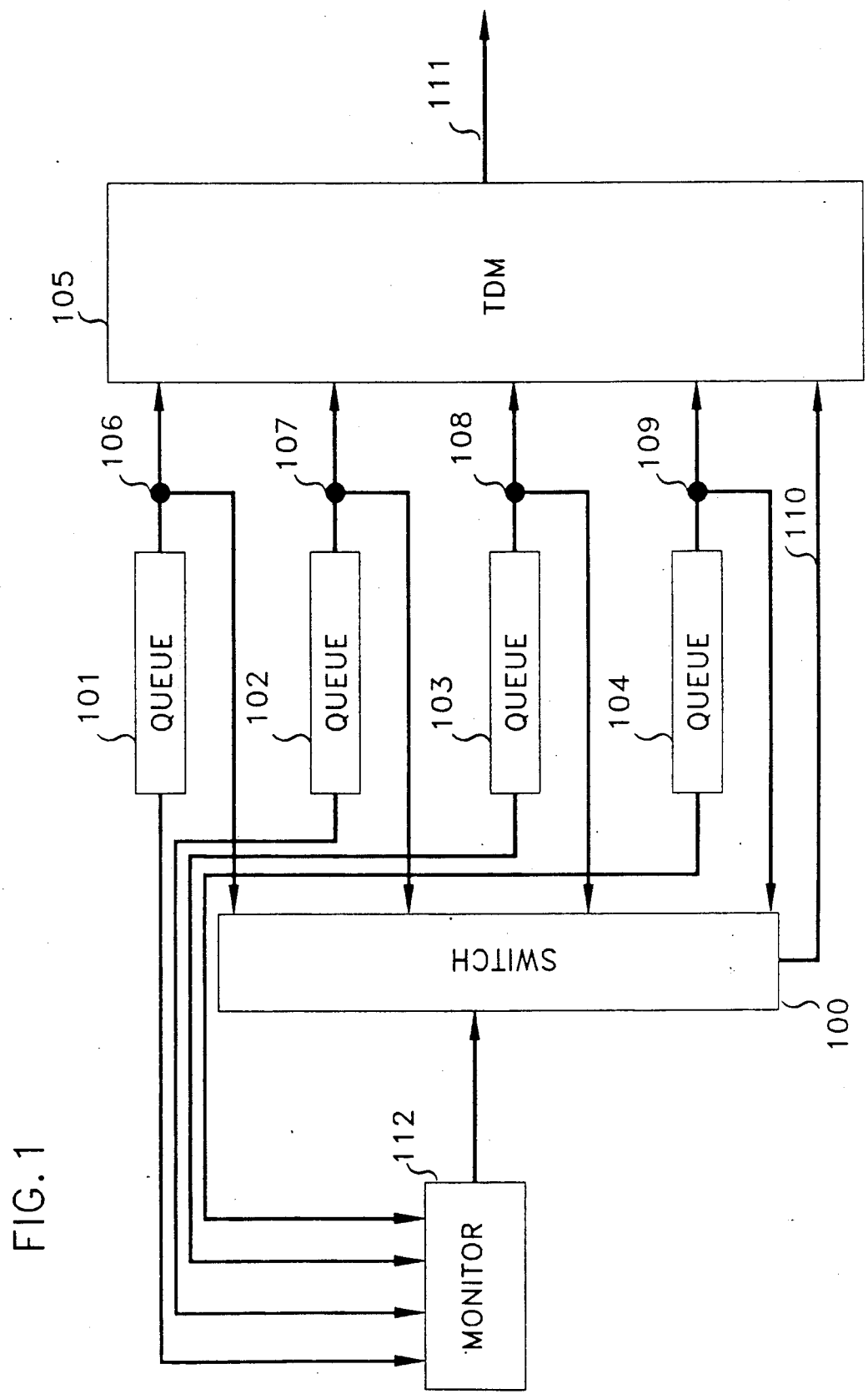
FIG. 1 shows a simplified block diagram of a portion of a communications system including an exemplary embodiment of the invention.

FIG. 1 shows a block diagram of an exemplary embodiment of the invention comprising switch 100, a plurality of queues 101-104, an exemplary time division multiplexer (TDM) 105, communications link 111, and monitor 112. For simplicity and clarity of description, it is assumed that communications link 111 is divided into an exemplary five channels, and that each of multiplexer inputs 106-110 is associated with a separate one of the five channels. However, it will be apparent to those of ordinary skill in the art that any desired number of communications channels may be employed on communications link 111. During a polling cycle, each of the four queues 101-104 is polled for a predetermined amount of time, denoted a polling time. Additionally, multiplexer input 110 is polled for a polling time during each polling cycle. Thus, each polling cycle comprises five polling times, one for each of the four exemplary queues 101-104, and a final polling time for multiplexer input 110.

In operation, time division multiplexer 105 sequentially polls the queues 101-104 in a predetermined order in well-known fashion. During the polling time for each of queues 101-104, data in the particular one of queues 101-104 is supplied to the corresponding multiplexer input 106-109, respectively, and transmitted on the associated channel of communications link 111. In addition, during the polling time for each one of queues 101-104, monitor 112 stores a record of the fullness of each queue. This fullness represents how near the queue is to a data overflow condition and may be, for example, the percentage of the queue which is occupied by data. Monitor 112 also records the address of the particular queue being polled.

Since monitor 112 is arranged to monitor the particular queue being polled, it is necessary to keep monitor 112 synchronized with multiplexer 105. This is readily achieved by, for example, deriving the clock for monitor 112 from the clock which is employed by multiplexer 105.

After queues 101-104 have been polled, monitor 112 contains the address of the one of queues 101-104 which is nearest to a data overflow condition. Monitor 112 then supplies a control signal to switch 100. This control signal causes switch 100 to connect the one of queues 101-104 which is nearest to a data overflow condition to multiplexer input 110. Thus, the fifth polling time in each polling cycle is used for whichever queue is nearest to a data overflow condition.

From the above discussion, it can be appreciated that multiplexer 105 input 110 may be utilized to transmit data from a different one of the four queues 101-104 in each polling cycle. Specifically, whichever one of queues 101-104 is nearest to a data overflow condition during a polling cycle will be switched to multiplexer input 110 during the fifth polling time of that polling cycle.

In the above manner, congestion in the network is slowed. More particularly, assume queue 103, for example, receives a sudden burst of data and, thereby becomes very near to a data overflow condition. As can be seen from the above discussion, queue 103 would be serviced twice in a polling cycle, since it would be nearest to a data overflow condition and would thereby be connected via switch 100 to multiplexer input 110. This servicing of queue 103 twice in a polling cycle continues until queue 103 is no longer nearer to the data overflow condition than queues 101, 102, and 104.

FIG. 2 shows a flow chart depicting operational steps of an exemplary algorithm which may be implemented in monitor 112. In FIG. 2, "i" denotes the address of the particular one of queues 101-104 currently being polled, and the fullness denotes the percentage of the queue which is occupied by data, for example, packets. For purposes of explanation, queues 101-104 are assumed to be at addresses 1-4, respectively.

The algorithm is entered via step 200. At the start of a polling cycle, step 201 sets i=1, corresponding to queue 101, and fullness=0, corresponding to an empty queue. As the first queue 101 is polled by time division multiplexer 105, the "fullness" of queue 101 is written to monitor 112 by step 202. Step 203 then compares the fullness written in, to the fullness stored, which is initially zero. If the written in fullness is greater, step 204 will replace the stored fullness with the written in fullness. Additionally, step 204 will replace the stored address with the address of the ith queue. If however, the written in fullness is less than or equal to the stored fullness, then the stored fullness and address will not be updated.

Next, step 205 determines if all the queues have been polled for the current polling cycle. If they have not all been polled, step 206 will increment the queue address i, i.e. i=i+1. Steps 202-205 are then repeated as shown in FIG. 2. Thus, it can be appreciated that after the queues have all been polled, the address of the most full queue, and its fullness, are stored in monitor 112. After the last queue is polled, step 207 sends a control signal to switch 100. This control signal causes switch 100 to connect the queue which is nearest to a data overflow condition; i.e. the most full, to multiplexer input 110, thereby servicing this queue two times in the polling cycle. The algorithm then returns to step 201 for the start of the next polling cycle.

Several further points about the operation of this embodiment of the invention are worth noting. First, the technique will not alleviate congestion completely. If a particular queue continues to receive data at a higher rate than the data can be transmitted on the associated channel of communications link 111, then that queue will eventually experience data overflow. The technique does however, delay the occurrence of overflow so that sufficient time exists to signal the source of the data and thereby slow or stop transmission. It should also be noted that while an extra channel is utilized to control congestion, such extra channel is never held idle when no congestion exists. Rather, as can be appreciated from the above discussion, such extra channel is utilized in every polling cycle, and is dynamically allocated to whichever queue is nearest to a data overflow condition in that particular polling cycle.

It should also be noted that the receiving terminal would have to switch data from the channel associated with input 110 of multiplexer 105 to an associated destination. In a packet system, an address in the packet header could be utilized to accomplish this function at the receiver in accordance with well known techniques. In other systems, out-of-band signalling could be utilized.

It is to be understood that the example given above is for illustrative purposes only and is not to be construed as limiting the scope or spirit of the invention. Other variations may be constructed by those of ordinary skill in the art. For example, more than one extra channel could be employed. The communications link could actually be several physical connections, one or more of which are used for whichever queue requires them. The communications link could be fiber optic, in order to facilitate high speed.

We claim:

1. In an apparatus for generating a plurality of N communications channels, and including a plurality of at most N−1 queues, a method of controlling transmission congestion comprising the steps of:
   (a) polling one of the queues, and transmitting data therefrom on an associated separate one of the N channels during such time when the queue is polled;
   (b) repeating step (a) for each of the plurality of at most N−1 queues, thereby leaving at least one remaining channel;
   (c) determining at least one queue which has the most data stored therein relative to the other queues and outputting data therefrom on said at least one remaining channel; and
   (d) repeating steps (a) through (c).

2. The method of claim 1 wherein the communications link is a fiber optic communications link.

3. The method of claim 1 wherein the step (c) of determining and outputting comprises:
   monitoring a fullness associated with each queue;
   recording an address associated with a queue which is most full;
   generating a control signal in response to the recorded address;
   transmitting the control signal to a switch; and
   switching data from the queue associated with the recorded address to the communications link via the switch.

4. Apparatus for generating a plurality of N communications channels, the apparatus being adapted for connection to a communications link, comprising:
   a plurality of at most N−1 queues;
   means for sequentially polling said queues and for outputting data from each queue on an associated separate one of said N communications channels during such time when said queue is polled, thereby leaving at least one remaining communications channel;
   means for monitoring each of said queues to determine at least one of said queues which has the most data stored therein relative to the other queues; and
   means for switching data from said at least one queue which has the most data stored therein to said means for sequentially polling and for outputting, thereby causing data from said at least one queue which has the most data stored therein to be output on said at least one remaining channel.

5. The apparatus of claim 4 wherein said communications link is a fiber optic communications link.

6. The apparatus of claim 4 wherein the means for monitoring includes means for monitoring a fullness associated with each queue, and for recording an address associated with a queue which is most full.

7. The apparatus of claim 6 wherein the means for sequentially polling comprises a Time Division Multiplexer, the Time Division Multiplexer including a plurality of outputs, each output arranged to receive data from a separate one of the N−1 queues.

8. The apparatus of claim 5 wherein the means for monitoring includes means for monitoring a fullness associated with each queue, and for recording an address associated with a queue which is most full.

9. The apparatus of claim 8 wherein the means for sequentially polling comprises a Time Division Multiplexer, the Time Division Multiplexer including a plurality of outputs, each output arranged to receive data from a separate one of the N−1 queues.

* * * * *